(12) United States Patent
Brawn

(10) Patent No.: US 10,159,214 B2
(45) Date of Patent: Dec. 25, 2018

(54) EASY CLEAN ANIMAL LITTER BOX

(71) Applicant: John F. Brawn, Peoria, AZ (US)

(72) Inventor: John F. Brawn, Peoria, AZ (US)

( * ) Notice: Subject to any disclaimer, the term of this patent is extended or adjusted under 35 U.S.C. 154(b) by 245 days.

(21) Appl. No.: 15/046,433

(22) Filed: Feb. 17, 2016

(65) Prior Publication Data

US 2017/0231190 A1    Aug. 17, 2017

(51) Int. Cl.
*A01K 1/01* (2006.01)

(52) U.S. Cl.
CPC ............ *A01K 1/0114* (2013.01); *A01K 1/011* (2013.01)

(58) Field of Classification Search
CPC .... A01K 1/0114; A01K 1/011; A01K 1/0132; A01K 1/01
USPC .......................................... 119/161, 166, 168
See application file for complete search history.

(56) References Cited

U.S. PATENT DOCUMENTS

| | | | |
|---|---|---|---|
| 3,261,545 A | 7/1966 | Frazier | |
| 4,522,150 A | 6/1985 | Gershman | |
| 4,664,455 A | 5/1987 | Greenhow | |
| 4,854,267 A * | 8/1989 | Morrow | A01K 1/0114 119/161 |
| 4,886,014 A | 12/1989 | Sheriff | |
| 5,048,465 A * | 9/1991 | Carlisi | A01K 1/011 119/161 |
| 5,178,099 A | 1/1993 | Lapps et al. | |
| 5,181,480 A | 1/1993 | Dabolt | |
| 5,226,388 A * | 7/1993 | McDaniel | A01K 1/0114 119/166 |
| 5,259,340 A * | 11/1993 | Arbogast | A01K 1/0114 119/165 |
| 5,402,751 A | 4/1995 | De La Chevrotiere | |
| 5,507,252 A | 4/1996 | Ebert | |
| 5,544,620 A * | 8/1996 | Sarkissian | A01K 1/0114 119/166 |
| 5,601,052 A | 2/1997 | Rood et al. | |
| 5,673,648 A | 10/1997 | Ayle | |
| 5,702,197 A | 12/1997 | Chen | |
| 5,823,137 A | 10/1998 | Rood et al. | |
| 5,911,194 A * | 6/1999 | Pierson, Jr. | A01K 1/0114 119/166 |
| 6,295,949 B1 | 10/2001 | Willis | |
| 6,997,137 B1 * | 2/2006 | Ricke | A01K 1/011 119/165 |
| 7,198,006 B2 * | 4/2007 | Fischer | A01K 1/0114 119/166 |
| 7,278,372 B2 | 10/2007 | Colsky | |

(Continued)

FOREIGN PATENT DOCUMENTS

DE    10158965 A1 *  6/2003  ........... A01K 1/0114

*Primary Examiner* — Marc Burgess
*Assistant Examiner* — Morgan T Barlow
(74) *Attorney, Agent, or Firm* — Mark V. Loen

(57) ABSTRACT

An animal litter box is designed for convenient cleaning. An animal leaves waste that is generally made up of clumps and fecal material inside or on top of animal litter. A flexible and lift-able tray is immersed in the animal litter. To clean the litter box, the tray is lifted up which strains the pet waste out of the animal litter. The tray is rotated further so the animal waste is conveniently discharged into a waste bag. The tray is returned to position for re-use by rotating the litter box so as to drain the animal litter away from the tray's normal position. The litter box is rotated back to normal position, and the tray and litter then are repositioned into a re-usable litter box.

2 Claims, 4 Drawing Sheets

(56) References Cited

U.S. PATENT DOCUMENTS

| | | | |
|---|---|---|---|
| 7,293,528 B2* | 11/2007 | Fairhall | A01K 1/0114 |
| | | | 119/165 |
| 7,487,743 B1* | 2/2009 | Lane | A01K 1/0114 |
| | | | 119/161 |
| 7,647,889 B2* | 1/2010 | Horanoff | A01K 1/0114 |
| | | | 119/163 |
| 8,578,886 B1 | 11/2013 | Delisle | |
| 8,578,887 B2* | 11/2013 | Andrade | A01K 1/0114 |
| | | | 119/165 |
| 8,733,287 B2* | 5/2014 | Huck | A01K 1/0152 |
| | | | 119/165 |
| 9,185,879 B2* | 11/2015 | Bellini | A01K 1/0114 |
| 9,271,607 B2* | 3/2016 | Chung | B65F 1/1415 |
| 9,615,538 B2* | 4/2017 | Shamir | A01K 1/0114 |
| 2007/0039556 A1* | 2/2007 | Cook | A01K 1/011 |
| | | | 119/166 |
| 2009/0260577 A1 | 10/2009 | Lewis, II | |
| 2009/0288610 A1* | 11/2009 | Casiana | A01K 1/011 |
| | | | 119/166 |
| 2010/0008713 A1 | 1/2010 | Evans | |
| 2013/0019810 A1* | 1/2013 | Romano | A01K 1/0114 |
| | | | 119/167 |

* cited by examiner

# EASY CLEAN ANIMAL LITTER BOX

CROSS REFERENCE TO RELATED APPLICATIONS

Not Applicable

STATEMENT REGARDING FEDERALLY SPONSORED RESEARCH OR DEVELOPMENT

Not applicable.

REFERENCE TO SEQUENCE LISTING, A TABLE, OR COMPUTER PROGRAM LISTING

Not applicable.

BACKGROUND OF THE INVENTION (1) Field of the Invention

This invention is directed to collection of waste from animals which are confined to indoor dwellings by use of an animal litter box. The design of the litter box simplifies collection and disposal of the waste. In particular, certain components of an animal litter box are re-designed to create better, more reliable, and more convenient feline waste removal over current designs and methods in the art.

(2) Description of Related Art

There are a number of feline litter box styles currently available in the market. One of the more common and affordable method of collecting cat waste is to have a shallow pan filled with cat litter and utilize a manual screening scoop style to remove waste clumps. The person who has to collect cat waste in this method will need a high tolerance for pet waste odor. Many cat owners use this method, but some owners struggle with the odor and seek other solutions.

Though there may be a wide variety of clump removal methods in the industry, they may be categorized as vertical or horizontal screens that pass through the cat litter, either automatically or manually. The clumps are then discharged into a waste box within the cat litter box, or taken to a waste receptacle.

FIG. 5 shows a prior art litter box as seen in U.S. Pat. No. 5,823,137 by John D. Rood, et al. As is seen, the design is lacking in three important details which lower the usability.

1. The amount of litter fill is relatively small. The left side of the litter box has two flat portions that restrict the amount of litter fill that can be used at one time. When the litter box is rotated to reset the waste removal tray, there is little room for the litter and it is likely to spill out of the lid and lid edges. The swinging tray is likely to push litter onto the floor as it rotates about a pivot point. It is desirable to use a different geometric design to increase the storage volume of the litter box to avoid spillage.
2. The waste removal tray is too rigid. The size of the waste removal tray requires the lid opening to be large, placing an additional restraint on the amount of litter than can be used at one time. It is desirable to improve the tray design to shrink the size of the lid and thereby improve the amount of litter that can be used at one time.
3. The litter box is open. When rotating the box, there is the likelihood of litter spilling, depending upon how fast the box is rotated. Also, an open design has poor odor control. It is desirable to address this issue to improve odor control and overall feeling of sanitation.

BRIEF SUMMARY OF THE INVENTION

The embodied design is an animal litter box that is designed to conveniently remove pet waste. After use, the animal waste generally comprises clumps and fecal material inside or on top of animal litter. The embodied invention includes a flexible and lift-able tray that is immersed in the animal litter. The tray is lifted up which strains the pet waste out of the animal litter. The tray is rotated further so as to conveniently discharged the pet waste into a waste bag, and the tray is returned to position for re-use by rotating the litter box so as to drain the animal litter away from the tray's normal position. The litter box is rotated again which resets the litter and tray into normal position for re-use. Improved tray flexibility and improved animal litter storage during the rotation of the litter box provide important improvements.

BRIEF DESCRIPTION OF THE SEVERAL VIEWS OF THE DRAWING(S)

DETAILED DESCRIPTION OF THE INVENTION

The embodied invention has a number of advantages over current pet waste disposal from a litter box. It is able to be cleaned in a convenient and easy method. It requires no batteries, electricity, liners or filters. The hinged filtering tray separates clean litter from waste with little spillage of pet waste. The Litter box is large and comfortable for a cat (or other animal) and is easy to clean by rocking the frame onto one end and then and rocking it back and forth to smooth out the pet litter. Consequently, a large amount of cat litter can be used to eliminate the need for frequent cleaning.

The pet waste is directed into a convenient bag for disposal. Pet waste odors controlled by enclosing the litter box. The box size can be scaled for larger or smaller pets, or increased in size for multiple pets that use it. Manual scooping of clumps and fecal material is avoided. Preferably, the design is affordable as it is made from plastic and able to be mass produced.

Additionally, the embodied design incorporates a temporary storage area for pet litter that is large and of sufficient volume to hold the amount of litter in the tray, thus avoiding difficulties with small amounts of cat litter that are used in other designs. The large temporary storage area provides for a pet litter amount to be sufficient for multiple days, rather than one or two days as seen in current commercial designs.

The embodied design is targeted toward pets, and will be very useful for cats in particular. However, the design is meant to be useful for a wide variety of animals that are inclined to use pet litter (i.e. cat litter).

Figure 1A:
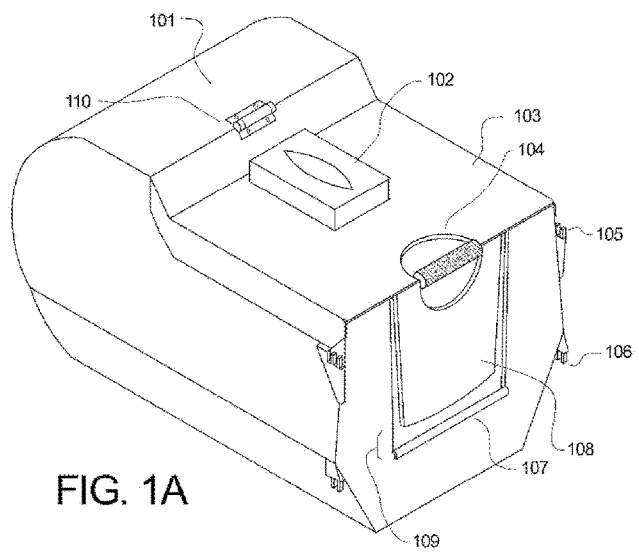
FIG. 1A shows an outer view of the litter box in perspective view.

FIG. 1A shows an embodied litter box comprising a rocker frame 101 with a lid 103, a litter box lifting handle, 104, a swinging pet door 108 (both directions), a tray pivot fold 107, and a waste discharge opening 109 under the pet door 108. The animal, preferably a cat, will enter the litter box through the swinging pet door 108, and into the box to urinate or leave droppings. The animal then exits through the same pet door. The normal case is to leave the lid on the rocker box in order to minimize odor and rotate it out of the way for animal waste removal. A lid hinge 110 is used to rotate the lid 103. The rocker frame substantially described as having six sides: upper/lower, entry/back, and two vertical sides. The vertical sides are preferably designed to be larger than the lower side so as to allow more room for a pet.

In a preferred embodiment, the cat litter (sometimes called cat sand) is a clumping type to facilitate easy and convenient removal of pet waste.

To facilitate easy removal of the pet waste, waste disposal bags 102 are attached to the litter box at upper 105 and lower 106 bag attachments. The waste disposal bags are preferably a flexible material such as a re-used grocery bag or another plastic bag suitable for waste disposal. A box of waste disposal bags 102 are preferably attached to the lid for convenience as illustrated.

Figure 1B:
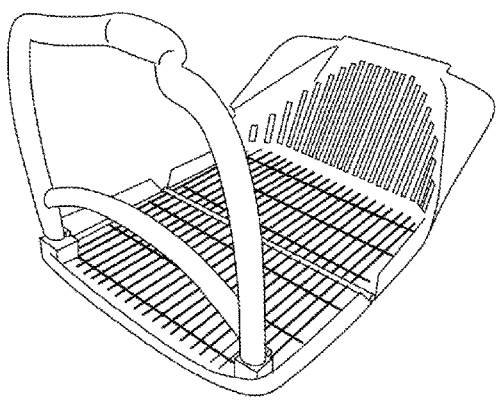
FIG. 1B shows the litter tray.
Figure 1C:
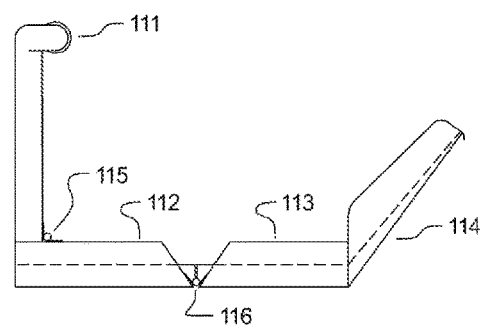
FIG. 1C shows a breakdown of the parts of the litter tray.

To remove the pet waste and separate it from the cat litter, a litter tray is illustrated in FIG. 1B. In FIG. 1C the tray parts are noted. A tray handle 111 is used to lift the litter tray out of the cat litter. A slotted bed (such as a grate or wire rack) inside the litter tray is divided into a bed pivoting portion 112 and a bed fixed portion 113. A discharge scoop 114 is rigidly attached to the fixed tray portion 113. To improve flexibility in removal of pet waste, and to allow convenient lifting with a small lid size, two hinges are used to provide flexibility to the litter tray. A handle hinge 115 is used to allow the tray handle 111 to fold downward on top of the pivot tray 112. The handle hinge 115 is designed to stabilize the tray handle to completely upright when it is in position for use (i.e. the pivot tray and fixed tray are horizontal and at the bottom of the rocker box). A tray hinge 116 is used to add flexibility in the tray by allowing the fixed tray and pivoting tray to bend. The tray hinge is designed so as to allow a flat tray, and also allow the left end (as viewed) of the pivoting tray to move upwardly and then toward the fixed tray.

The litter tray is snapped onto a tray pivot fold at the end of the discharge shoot. This allows the discharge shoot to rotate about the tray pivot fold and also provides for the litter tray to hang downwardly during the pet waste removal procedure.

Figure 2A:
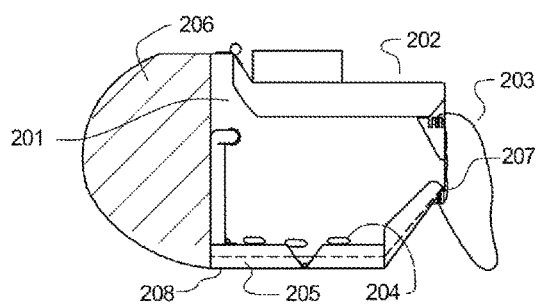
FIGS. 2A-2H Show cross sectional views of how the litter box is cleaned from pet waste.

FIG. 2A shows a pet litter box with pet waste that is ready to be removed. A handle 201 is used to manually lift the tray. A lid 202, waste bag 203, pet waste 204 to be removed, and pet litter 205 are particularly pointed out. The litter tray pivots about a tray pivot 207. The litter tray sits within a flat area 208 on the lower side of the rocker frame. A pet litter storage volume 206 is unused in this position.

Figure 2B:
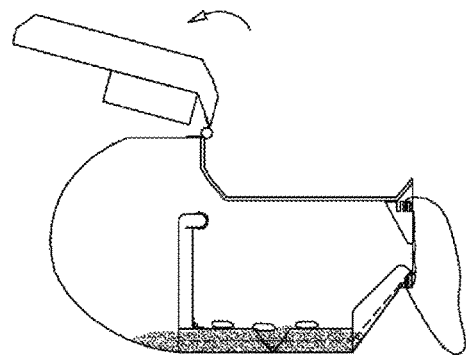
Figure 2C:
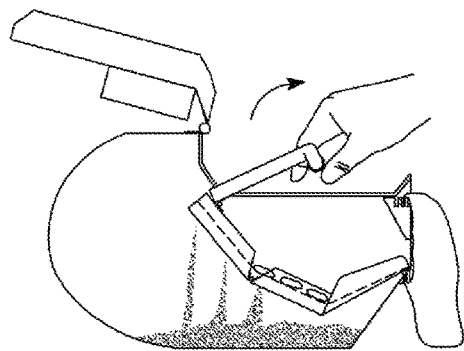
Figure 2D:
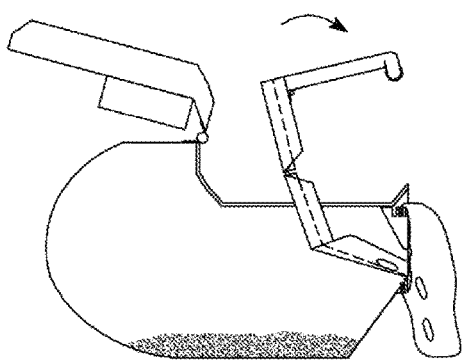
Figure 2E:
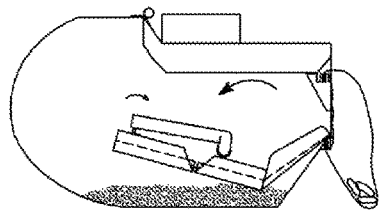
Figure 2F:
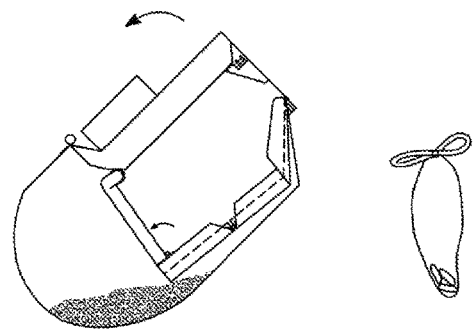
Figure 2G:
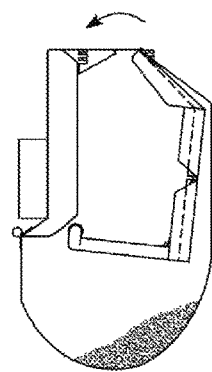
Figure 2H:
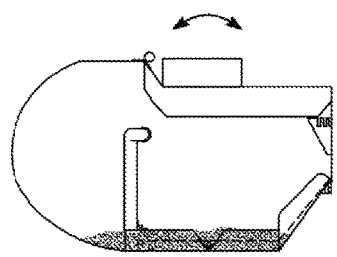

FIGS. 2B-2H show how pet waste is removed from the pet litter. In FIG. 2B the lid is opened. In FIG. 2C the handle is manually pulled forward and then lifted. The waste clumps are then lifted out of the pet litter which drains out through the slots in the litter tray. The waste clumps are larger than the slots in the slotted bed which allows the clumps to be lifted out with the tray. In FIG. 2D the handle is moved in a way so as to allow the waste clumps to be discharged into the waste bag. In FIG. 2E, the tray is lowered back into the rocker frame and allowed to rest on top of the pet litter; and the lid is closed In FIG. 2F, to conveniently lower the tray back into the pet litter, the entire rocking frame is rotated as illustrated which allows the tray to hang on the tray pivot fold and the pet litter to drain onto the temporary storage volume of the rocker frame. The waste bag is removed and readied for placing in a suitable waste container. In FIG. 2G, the rocker frame is rotated 90 degrees (CCW as viewed) from horizontal so as to allow the pet litter to completely drain into the curved portion (temporary storage volume) of the rocker frame. In FIG. 2H, the rocker frame is returned to horizontal and rocked back and forth as needed so as to smooth the pet litter on top of the tray. The litter tray naturally re-seats into the recessed area of the rocker frame.

Figure 3:
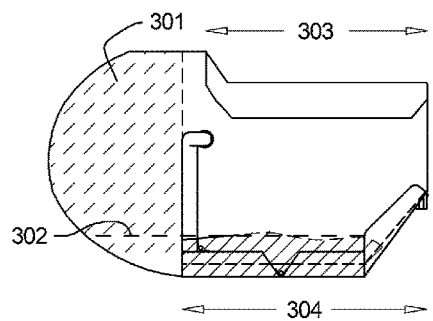
FIG. 3 shows important dimensions for the animal litter box.

FIG. 3. shows the temporary storage volume 301 for pet litter that is used during the pet waste removal process. The temporary storage volume 301 is matched to the normal fill line of the pet litter 302. By increasing the size of the temporary storage volume, the amount of pet litter per fill can also be increased. To facilitate a larger storing volume, the lid length 303 is decreased in size in comparison to the overall tray length 304. An improved tray flexibility accommodates different lid lengths by using a handle hinge and a tray hinge as previously described. The flexible tray design allows the lid length 303 to be 90% or less than the tray length 304. In a preferred embodiment, the tray length is as low as 60% of the lid length. The tray width will be substantially the same width as the lid. In a preferred embodiment, the tray width is slightly smaller in width than the lid width to facilitate easy tray rotation about the pivot point.

By making the lid a reduced size relative to the tray, the amount of contact between the lid and rocker frame is reduced, which will mean little to no leaking when the litter box is rotated for cleaning. Also, reducing the lid length makes the temporary storage volume larger, which additionally reduces the amount of litter leakage as the temporary storage volume will handily contain all of the pet litter during the litter box rotation.

In a preferred embodiment, the pet litter fill is at least 3 inches deep as measured from the bottom of the litter tray. The inner sides of the litter tray are preferably marked at the pet litter fill level, but this is not a requirement. The thicker pet litter fill will facilitate longer times between pet waste removal. However, it is usually desirable that the litter be cleaned on a daily basis. The temporary storage volume must then be at least three inches times the surface area of the flat portion of the tray. A smaller lid provides for improved pet litter volume in the temporary storage area. Therefore, the lid length is preferably 60-90% of the length of the litter tray as previously stated. With a smaller lid length, a larger amount of pet litter can be used. Conversely, when a longer lid length is used, a smaller amount of pet litter can be used. Additionally, pet litter spillage is a concern around the edges of the lid and the larger pet litter volume in the temporary storage area is preferred to avoid pet litter contacting the lid.

A curved surface on the back side will provide the best overall temporary storage volume in consideration of the need to rotate the rotating frame.

Figure 4A:
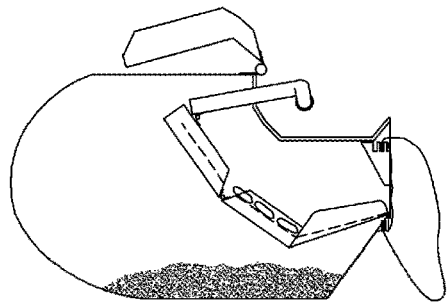
FIGS. 4A-4B shows how improved flexibility in the litter tray allows a smaller lid length.
Figure 4B:
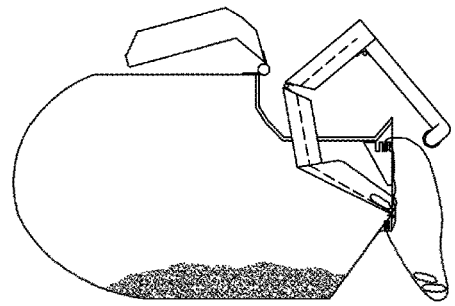
Figure 5:
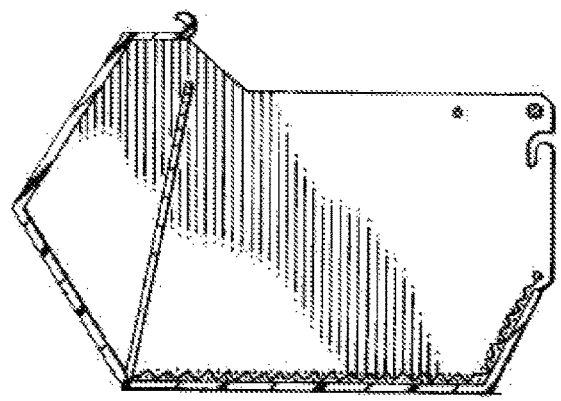
FIG. 5 shows a prior art rotatable litter box.

FIGS. 4A-4B show how improved flexibility in the litter tray allows a smaller lid length. As shown, the handle hinge allows the handle to move forward and the tray hinge allows the slotted portion of the tray to flex making it more convenient for a person to pull the tray upwardly.

While the embodied invention describes articles and methods for cleaning a pet litter box and disposing pet waste, it should be recognized that the invention is also useful for other animals where it is desirable to collect animal waste in a confined area, and provide easy cleaning and removal of the animal waste from animal litter.

While various embodiments of the present invention have been described, the invention may be modified and adapted to various operational methods to those skilled in the art. Therefore, this invention is not limited to the description and figure shown herein, and includes all such embodiments, changes, and modifications that are encompassed by the scope of the claims.

I claim:

1. An improved animal litter box for pet waste cleaning comprising:
   A. a six sided rotating frame further comprising an entry side, back side, upper side, and lower side,
   B. wherein the entry side further comprises a pet door,
   C. wherein the back side is curved so as to allow the rotating frame to rotate,
   D. wherein the upper side further comprises a rotatable lid,
   E. a litter tray located on the lower side,
   F. wherein the litter tray further comprises:
      a. a lifting handle,
      b. a rectangular shaped slotted bed further comprising:
         i. a front half proximal to said pet door and a back half distal to said pet door,
         ii. a center pivoting hinge that joins the front half and the back half,
         iii. wherein the center pivoting hinge is oriented parallel to the pet door, and
         iv. a plurality of slots,
      c. an end pivoting hinge that connects the lifting handle to the back half of the slotted bed,
      d. wherein the end pivoting hinge is distally located from the center pivoting hinge on the back half of the slotted bed, and
      e. wherein the end pivoting hinge allows the lifting handle to rotate toward the center pivoting hinge,
   G. wherein the slotted bed further comprises slots that are smaller in size than collected pet waste,
   H. a pet waste pivot point on the rotating frame located under the pet door,
   I. wherein the litter tray, further comprises a rotatable connection to the pet waste pivot point,
   J. wherein the rotating frame resets the litter tray position and animal litter by a rotation of the rotating frame on the back side, and
   K. wherein the rotating frame further comprises a thickness of at least 3 inches of the pet litter in the litter tray, and
   L. wherein the lid length is between 60% to 90% of the length of the litter tray.

2. A method to clean an animal litter box by a rotation of the animal litter box comprising:
   A. Providing:
      a. a six sided rotating frame further comprising an entry side, back side, upper side, and lower side, wherein the entry side further comprises a pet door,
      b. a curved surface on the back side that provides for the rotating frame to rotate,
      c. a lid for the upper side, wherein the lid is attached by a lid hinge,
      d. wherein the curved surface provides a temporary storage volume for pet litter,
      e. a litter tray located on the lower side,
      f. wherein the litter tray further comprises:
         a. a lifting handle,
         b. a rectangular shaped slotted bed further comprising:
            i. a front half proximal to said pet door and a back half distal to said pet door,
            ii. a center pivoting hinge that joins the front half and the back half,
            iii. wherein the center pivoting hinge is oriented parallel to the pet door, and
            iv. a plurality of slots,
         c. an end pivoting hinge that connects the lifting handle to the back half of the slotted bed,
         d. wherein the end pivoting hinge is distally located from the center pivoting hinge on the back half of the slotted bed, and
         e. wherein the end pivoting hinge allows the lifting handle to rotate toward the center pivoting hinge,
      h. wherein the litter tray further comprises slots that are smaller than pet waste,
      i. a litter tray pivot point on the rotating frame,
      wherein the lid length is between 60% to 90% of the length of the litter tray, and
      j. pet litter three inches thick as measured from the bottom side,
   B. allowing a pet to utilize pet litter in the rotating frame to eliminate pet waste,
   C. rotating the lid to an open position,
   D. lifting the litter tray out of the pet litter and discharging the pet waste to a waste container by use of the litter tray pivot point,
   E. placing the litter tray back into the rotating frame,
   F. closing the lid, and
   G. resetting the litter tray into position by:
      a. a rotation of the rotating frame onto the curved surface,
      b. allowing the litter tray to hang from the litter tray pivot point,
      c. allowing substantially all of the pet litter to drop to the lower side of the rotating frame, and
      d. rotating the rotating frame back to horizontal.

* * * * *